United States Patent Office 3,340,144
Patented Sept. 5, 1967

3,340,144
ANTHELMINTIC COMPOSITIONS AND METHODS OF USING SAME
Henry Martin, Basel, Paul Schmidt, Therwil, and Max Wilhelm, Allschwil, Switzerland, assignors to Ciba Corporation, New York, N.Y., a corporation of Delaware
No Drawing. Filed Jan. 19, 1965, Ser. No. 426,685
Claims priority, application Switzerland, Apr. 2, 1962, 3,969/62
15 Claims. (Cl. 167—53)

This is a continuation in part of our application Ser. No. 264,766, filed Mar. 13, 1963, now abandoned.

The present invention provides new pharmaceutical preparations having an anthelmintic effect, more especially upon tape worms such as *Taenia saginata, Hymenolepis nana, Diphyllobothrium latum, Taenia solium, Dipylidium canium,* and also upon oxyuridae and trematodes, as well as processes for the manufacture of such preparations.

The new preparations contain as active component carbanilides of the formula

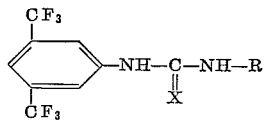

in which R represents a substituted or unsubstituted aromatic radical and X stands for oxygen or sulfur—in conjunction with a pharmaceutical excipient. By virtue of the effect referred to above the new preparations are suitable for use by mammals as medicaments for the treatment of attacks by worms, more especially tape worms, for example those mentioned above, or by oxyuridae.

As excipients there may be used the conventional substances, more especially those which are suitable for enteral administration, for example water, gelatin, lactose, starches, magnesium stearate, talc, vegetable oils, benzyl alcohols, gums, polyalkylene glycols, cholesterol or other known medicinal excipients. The preparations may be, for example, tablets, capsules, dragees, powders or suppositories, or in liquid form solutions (suitable, for example, for subcutaneous or intravenous injection), suspensions or emulsions. They may be sterilized and/or may contain assistants such as preserving, stabilizing, wetting or emulsifying agents, or substances for modifying the taste, aroma or color. They may also contain further medicinally valuable substances. More especially, by adding a laxative lubricant (for example paraffin oil or castor oil) the removal of the worms killed or damaged by the action of the preparation may be accelerated.

The new preparations are advantageously used in the form of tablets, dragees or capsules which contain, for example, 25 to 2000 mg., especially 100–500 mg. of the carbanilide per dosage unit. The daily dose varies according to the nature and special circumstances of the individual case; it amounts for example to 25 to 2000 mg., ordinarily 1–2 g. It is of advantage to extend the treatment over several days, with particular advantage for 3 days.

The carbanilides preferably used in the aforementioned preparations correspond to the general Formula I in which R represents a substituted or unsubstituted phenyl radical and X stands for oxygen or sulfur, and among these compounds those deserve special mention which correspond to the general formula

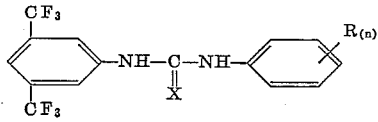

in which R represents an alkyl or alkoxy group, such as a lower alkyl or lower alkoxy group, a fluorine, chlorine, bromine or iodine atom, or the group —$CF_3$, —$NO_2$, —CN, —$SO_3H$, —$SO_2NH_2$, —$SO_2CH_3$, —OH, —SCN, —$SO_2NHA$

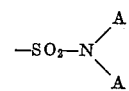

—COOM, —$COCH_3$, —COOA, —$CONH_2$, —CONHA or $CONA_2$ in which A stands for an alkyl group, preferably a lower alkyl group, $n$ is a whole number from 1 to 4, and X stands for oxygen or sulfur.

Especially valuable is the 3:5-bis-trifluoromethyl-4'-nitrocarbanilide and the corresponding thiocarbanilide of the formula

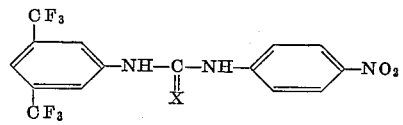

wherein X stands for O or S.

As further examples of compounds of the general Formula I there may be mentioned:

Carbanilides of the general formula

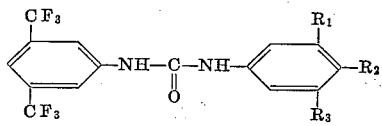

in which $R_1$, $R_2$ and $R_3$ are identical or different and each represents an alkyl or alkoxy group, a fluorine, chlorine, bromine or iodine atom, the group —$CF_3$, —$NO_2$, —CN, —$SO_3H$, —$SO_2NH_2$, —$SO_2CH_3$, —$SO_2NHA$, —OH, —SCN

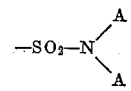

—COOH, —COOA, —$CONH_2$, —CONHA or —$CONA_2$ in which A stands for a lower alkyl group and X for oxygen or sulfur;

Carbanilides of the general formula

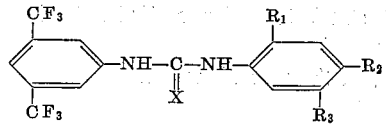

in which $R_1$, $R_2$, $R_3$ and X have the above meanings;

Carbanilides of the general formula

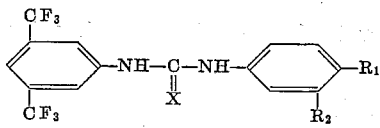

in which $R_1$ and $R_2$ are identical or different and each represents an alkyl or alkoxy group, a fluorine, chlorine, bromine or iodine atom, the group —OH, —SCN, —$CF_3$, —$NO_2$, —CN, —$SO_3H$, —$SO_2NH_2$, —$SO_2CH_3$

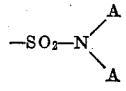

—$SO_2NHA$, —COOH, —COOA, —$CONH_2$, —CONHA or $CONA_2$ in which A stands for a lower alkyl radical and X for oxygen or sulfur;

Carbanilides of the general formula

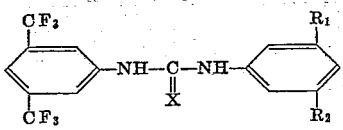

in which $R_1$, $R_2$ and X have the above meanings;

Carbanilides of the general rormula

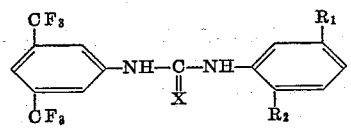

in which $R_1$, $R_2$ and X have the above meanings;

Carbanilides of the general formula

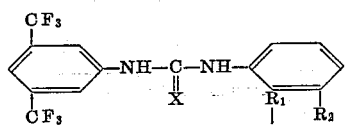

in which $R_1$, $R_2$ and X have the above meanings;

Carbanilides of the general formula

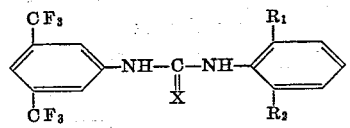

in which $R_1$, $R_2$ and X have the above meanings;

Carbanilides of the general formula

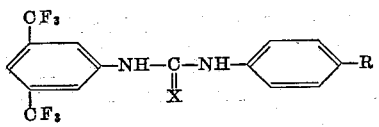

in which R represents an alkyl or alkoxy radical, a fluorine, chlorine, bromine, or iodine atom, the group —$CF_3$, —CN, —SCN, —$SO_3H$, —$SO_2NH_2$, —$SO_2CH_3$, —$COCH_3$, —$SO_2NHA$

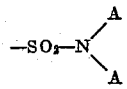

—COOH, —COOA, —$CONH_2$, —CONHA or —$CONA_2$ in which A stands for a lower alkyl radical and X for oxygen or sulfur;

Carbanilides of the general formula

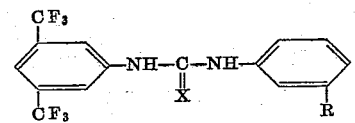

in which R and X have the above meanings, for example the compounds of the formulae a) 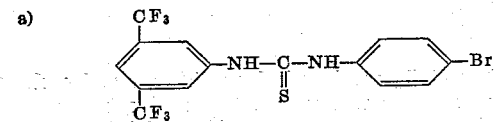

b) 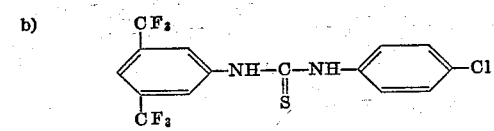

c) 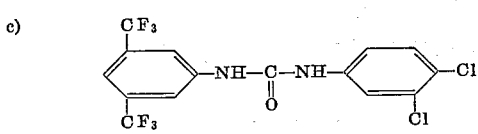

d) 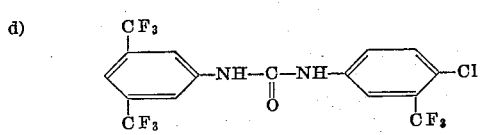

e) 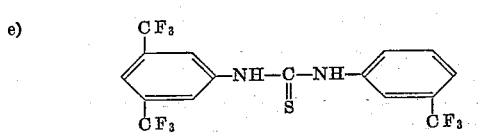

f) 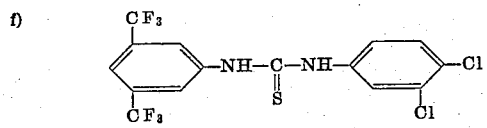

The carbanilides to be used in the present invention can be made by known methods. Quite generally, the compounds are obtained, for example, by reacting the parent materials of the general formulae

and

the two symbols A and B always being so chosen that they react together with formation of a urea or thiourea bridge, and R and n have the meanings defined above in the case of the general Formula II. The reaction may be performed, for example, by reacting a compound of the general formula

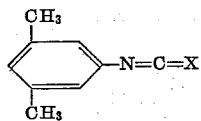

(in which X stands for oxygen of sulfur) with a compound of the general formula $NH_2$—R (in which R represents a substituted or unsubstituted aromatic radical); or by reacting a compound of the general formula

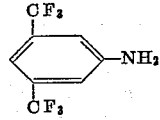

with a compound of the general formula

R—N=C=X in which R and X have the above meanings.

In manufacturing the compounds of the invention 3:5-bis-trifluoromethylphenyl isocyanate is reacted, for example, with one of the following compounds: Aniline or substituted anilines such, for example, as parachloraniline, 3:4-dichloraniline, 3:5-dichloraniline, 2:5-dichloraniline, 3:4:5 - trichloraniline, 2:4:5 - trichloraniline, 3-chloro-4-bromaniline, 3-chloro-4-methoxy-aniline, 3-chloro-4-methylaniline, 3 - trifluoromethyl - aniline, 2-chloro-5-trifluoromethylaniline, 3 - trifluoromethyl - 4-chloraniline, bis-3:5-trifluoromethylaniline, 4-bromaniline, 2:4-dichloraniline, 4 - aminobenzene - sulfonylamide, 4 - aminobenzoic acid methyl ester, 4-butoxyaniline, 4-thiocyananiline, 4-aminoacetophenone, 4-aminophenylacetic acid methyl ester, 3-bromaniline, 4-chloro-3-methylaniline, 4-chloro-2-methylaniline, 3:5 - dichloro - 4-methylaniline, 4-chloro-3:5-dimethylaniline; hydroxyaminobenzenes such, for example, as 4-chloro- or 5-chloro- or 4:5-dichloro-2-amino-1-hydroxybenzene, 3:4:6 - trichloro - 2 - amino-1-hydroxybenzene, 4- or 5-bromo-2-amino-1-hydroxybenzene, 4:6-dibromo- or 4:6-dichloro-2-amino-1-hydroxybenzene, 4:5-dibromo-2-amino-1-hydroxybenzene, or 4-chloro-3-trifluoromethyl-2-amino-1-hydroxybenzene.

Alternatively, bis-3:5-trifluoromethylaniline is reacted with a phenyl isocyanate or isothiocyanate, for example with one that contains one or several nitro groups, such as 4-nitrophenyl isocyanate, 3-nitro- or 2-nitro-phenyl isocyanate, 4-methyl-3-nitrophenyl isocyanate, 4-chloro-3-nitrophenyl isocyanate, 2-nitro-4-chlorophenyl isocyanate, 2-methyl-4-nitro-5-chlorophenyl isocyanate, 2-methoxy-4-nitro-5-chlorophenyl isocyanate, or 2:4-dinitrophenyl isocyanate.

The new pharmaceutical preparations may, for example, have the compositions described in the following examples:

Example 1

| | Mg. |
|---|---|
| 3:5-bis-trifluoromethyl-4'-nitrocarbanilide or thiocarbanilide | 500.0 |
| Starch | 31.0 |
| Colloidal silicic acid | 30.0 |
| Gelatin | 5.0 |
| Arrowroot | 35.0 |
| Magnesium stearate | 4.0 |
| Talcum | 20.0 |
| | 625.0 |

From the above ingredients split-type tablets of the above composition, weighing 625 mg. each, are made in usual manner.

Example 2

| | Mg. |
|---|---|
| 3:5 - bis - trifluoromethyl - 4'-nitrocarbanilide or thiocarbanilide | 200.0 |
| Lactose | 207.0 |
| Potato starch | 182.0 |
| Colloidal silicic acid with hydrolysed starch | 10.0 |
| Glycerine | 1.5 |
| Magnesium stearate | 4.5 |
| Talcum | 20.0 |
| | 625.0 |

From the above ingredients split-type tablets of the above composition, weighing 625 mg. each, are made in usual manner.

Example 3

The 3:5-bis-trifluoromethyl-4'-nitrocarbanilide used in the above examples may be prepared as follows:

A solution of 22.9 grams of 3:5-bis-trifluoromethylaniline in 100 cc. of acetonitrile is mixed with a solution of 16.5 grams of 4-nitrophenyl isocyanate in 25 cc. of acetonitrile. The temperature rises slowly to 32° C. and is then maintained for several hours at 50° C., with 3:5-bis-trifluoromethyl-4'-nitrocarbanilide slowly settling out in the form of a yellow crystalline substance which melts at 220–225° C. and then again at 300–305° C.

The following compounds are obtained in a similar manner:

3:5-bis-trifluoromethyl-3'-nitrocarbanilide; M.P. 230–232° C.

3:5-bis-trifluoromethyl-3'-nitro-4'-methylcarbanilide; M.P. 215–217° C.

3:5-bis-trifluoromethyl-4'-bromocarbanilide; M.P. 224–225.5° C. (on recrystallization from acetonitrile)

3:5-bis-trifluoromethyl-4'-chlorocarbanilide; M.P. 214.5–215.5° C. (on recrystallization from acetonitrile)

3:5-bis-trifluoromethyl-3':5'-dichlorocarbanilide; M.P. 219–219.5° C. (on recrystallization from acetonitrile)

3:5-bis-trifluoromethyl-4'-fluorocarbanilide; M.P. 213–214° C. (on recrystallization from acetonitrile)

3:5-bis-trifluoromethyl-2':4':5'-trichlorocarbanilide; melts on recrystallization from acetonitrile at 227–228° C., then solidifies again at 229° C. and sublimes at 270–275° C.

3:5-bis-trifluoromethyl-4'-n-butoxycarbanilide; M.P. 195–195.5° C. (on recrystallization from acetonitrile)

3:5-bis-trifluoromethyl-3'-chloro-4'-methylcarbanilide; M.P. 230–231° C. (on recrystallization from acetonitrile)

3:3':5-bis-trifluoromethyl-6'-chlorocarbanilide; M.P. 225–226° C. (on recrystallization from acetonitrile)

3:5-bis-trifluoromethyl-2':4'-dichlorocarbanilide; M.P. 192–194° C. (on recrystallization from acetonitrile)

3:5-bis-trifluoromethyl-2':5'-dichlorocarbanilide; M.P. 225.5–227° C. (on recrystallization from acetonitrile)

3:5-bis-trifluoromethyl-3'-chlorocarbanilide; M.P. 175–176° C. (on recrystallization from acetonitrile)

3:5-bis-trifluoromethyl-3'-bromocarbanilide; melts on recrystallization from nitromethane and washing with chloroform at 174–175° C.

3:5-bis-trifluoromethyl-3':4'-dimethylcarbanilide; M.P. 185.5–186.5° C. (on recrystallization from acetonitrile).

Furthermore, the following compounds may be prepared as described below:

(1) A solution of 16.2 grams of 3:4-dichloroaniline in 150 cc. of acetonitrile is mixed with a solution of 25.5 grams of bis-3:5-trifluoromethylphenyl isocyanate (boiling at 63° C. under 14 mm. Hg pressure) in 25 cc. of acetonitrile with vigorous stirring. After a short time the condensation product of the formula

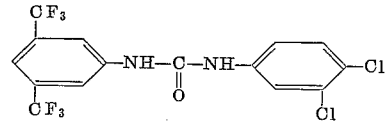

settles out. Another 25 cc. of acetonitrile are added and the batch is stirred for a few hours longer. The 3:5-bis-trifluoromethyl-3':4'-dichlorocarbanilide is suctioned off, washed with acetonitrile and dried under vacuum. Crude yield: 36 grams. The product melts at 223–224° C. and, after recrystallization from acetonitrile, at 227° C.

(2) A solution of 19.5 grams of 4-chloro-3-trifluoromethylaniline in 150 cc. of acetonitrile is mixed with a solution of 25.5 grams of bis-3:5-trifluoromethylphenyl isocyanate in 25 cc. of acetonitrile with vigorous stirring. Condensation takes place with slight heating up, but no precipitate forms. Evaporation under vacuum yields the tri-3:3':5-trifluoromethyl-4'-chlorodiphenyl urea in the form of an oil which solidifies soon. The crude product melts at 178–182° C.; the product recrystallized from chlorobenzene melts at 177–178° C. The condensation may alternatively be performed in chlorobenzene, whereupon the urea settles out spontaneously in crystalline form.

(3) A solution of 22.9 grams of bis-3:5-trifluoromethylaniline in 100 cc. of acetonitrile is mixed with vigorous stirring with a solution of 25.5 grams of bis-3:5-trifluoromethylphenyl isocyanate in 20 cc. of acetonitrile. The temperature rises to 32° C., but the solution remains clear. The condensation may alternatively be carried out without a solvent, by heating the reactants as they are on a water bath. The product is ground in benzene and suctioned off. On recrystallization from nitromethane tetra-3:5-3':5'-trifluoromethylcarbanilide melts at 253–256° C. The carbanilide may also be prepared by boiling 3:5-bis-trifluoromethylphenyl isocyanate with the calculated amount of water in acetonitrile.

(4) A solution of 19.32 grams of trifluoromethylaniline in 150 cc. of acetonitrile is mixed with a solution of 30.5 grams of bis-3:5-trifluoromethylphenyl isocyanate in 30 cc. of acetonitrile. After 2 hours the solvent is evaporated under vacuum and the crude product is recrystallized from chlorobenzene; it melts at 165–167° C.

(5) 3:5-bis-trifluoromethylphenyl isocyanate is run into a solution of 17.75 grams of 3-chloro-4-methoxyaniline (ortho-chloro-para-anisidine) in 100 cc. of acetonitrile. The reaction mixture heats up to 42° C., and 3:5-bis-trifluoromethyl-3′-chloro-4′-methoxycarbanilide settles partially out. The condensation product is recrystallized from acetonitrile; it melts at 188–190° C.

(6) 22.9 grams of 3:5-bis-trifluoromethylaniline are mixed with 18.9 grams of finely powdered 2-chloro-4-nitrophenyl isocyanate and the mixture is heated on a water bath, with the reaction mixture turning solid, accompanied by a strong evolution of heat. The condensation product is powdered, taken up with benzene and the residue is dried. Crude yield: 40 grams. On recrystallization from acetonitrile with addition of animal charcoal 3:5-bis-trifluoromethyl-2′-chloro-4-nitrocarbanilide is obtained in almost colorless, radially arranged, long needles melting at 222–212° C.

(7) A solution of 16.2 grams of 3:4-dichloraniline in a small amount of acetonitrile is added to 27 grams of 3:5-bis-trifluoromethylphenyl isothiocyanate (boiling at 83° C. under 12 mm. Hg pressure). The reaction mixture heats up to 82° C. within a short time; it is kept for 1 hour on a boiling water bath then evaporated under vacuum, whereupon 3:5-bis-trifluoromethyl - 3′:4′ - dichlorothiocarbanilide is obtained as a solid substance which is recrystallized from benzene. The purified product melts at 138–139° C. In an analogous manner the following compounds are obtained:

3:5-bis-trifluoro-2′:3′-dichlorocarbanilide; M.P. 222.5–223.5° C. (on recrystallization from acetonitrile)
3:5 3:5-bis-trifluoromethyl-4′-tertiary butylcarbanilide; M.P. 167–168° C.
3:5-bis-trifluoromethyl-4′-thiocyan-thiocarbanilide; M.P. 122° C.

(8) 27.1 grams of 3:5-bis-trifluoromethylphenyl thioisocyanate are added to a solution of 19.5 grams of 3-amino-6-chlorobenzotrifluoride in 20 cc. of acetonitrile, and the whole is kept for 1 hour on a water bath. The reaction mixture slightly changes color and turns thickly liquid; it is evaporated under vacuum and then heated for 2 hours at 90° C. The solid crude product melts at 139–141° C. It is heated in a little benzene mixed with animal charcoal, filtered, and the warm solution is mixed with an equal volume of cyclohexane, whereupon 3:3′:5-bis-trifluoromethyl-4′-chlorothiocarbanilide crystallizes out; it melts at 138.5–139° C.

(9) A solution of 16.5 grams of para-aminobenzoic acid ester in 100 cc. of acetonitrile is stirred with a solution of 25.5 grams of 3:5-bis-trifluoromethylphenyl isocyanate in 20 cc. of acetonitrile. The condensation product settles out after a few minutes; it is left to itself overnight, then suctioned off and dried under vacuum at 60° C. Crude yield: 39 grams. Melting point: 230–231° C. On crystallization from about 500 cc. of acetonitrile, 3:5-bis-trifluoromethyl-4′-carboxy-ethylcarbanilide melts at 230–231° C.

(10) Bis-3:3′:5-trifluoromethyl-thiocarbanilide is prepared as described above under (9). The crude product is dissolved in hot benzene, treated with animal charcoal, filtered, and the clear solution is mixed with an equal volume of cyclohexane, whereupon crystals are obtained which melt at 133–134° C.

3:5-bis-trifluoromethyl-4′-bromo-thiocarbanilide is prepared in a corresponding manner; on recrystallization from benzene+cyclohexane it melts at 163–164° C.

(11) A solution of 17.1 grams of para-aminophenyl-methyl sulfone in 100 cc. of acetonitrile is mixed with a solution of 25.5 grams of 3:5-bis-trifluoromethylphenyl isocyanate in 20 cc. of acetonitrile. While stirring the batch vigorously, the temperature is maintained at 65° C., whereupon 3:5 - bis - trifluoromethyl-4′-methyl-sulfocarbanilide crystallizes out overnight; it is recrystallized from acetonitrile and melts then at 224–225.5° C.

(12) Without using a solvent, 27.1 grams of 3:5-bis-tri-fluoromethylphenyl isothiocyanate are mixed with 22.9 grams of 3:5-bis-trifluoromethylaniline, and the whole is heated on a boiling water bath. The reaction mixture solidifies and forms a solid crystalline cake. On recrystallization from nitromethane and washing with benzene, 3:3′:5:5′-tetratrifluoromethyl - thiocarbanilide melts at 184.5–186° C.

(13) 17.2 grams of sulfanilamide are dissolved with slight heating in 180 cc. of acetonitrile, and a solution of 25.5 grams of 3:5-bis-trifluoromethylphenyl isocyanate in 25 cc. of acetonitrile is then vigorously stirred in. The reaction mixture slowly heats up to 45° C. It is then maintained for 3 hours at 65° C., during which 3:5-bis-trifluoromethyl-4′-sulfonamidocarbanilide settles out. On recrystallization from acetonitrile it melts at 228–230° C.

(14) 3:5-bis-trifluoromethyl-4′-chlorothiocarbanilide is prepared as described under (8) above. On recrystallization from benzene+cyclohexane it melts at 150–151° C.

(15) A mixture of 17.8 grams of para-dimethylaminophenyl isothiocyanate and 22.9 grams of 3:5-bis-trifluoromethylaniline is heated for several hours on a boiling water bath. The reaction mixture is at first liquid and then, after a short time, it turns into a crystalline substance which is expressed on a suction filter; 3:5-bis-trifluoromethyl-4′-dimethylamino-thiocarbanilide is then recrystallized from benzene.

(16) A solution of 16.5 grams of para-aminobenzoic acid ethyl ester in 15 cc. of acetonitrile is mixed with 27.1 grams of 3:5-bis-trifluoromethylphenyl isothiocyanate. The temperature soon rises to 65° C. and shortly afterwards 3:5 - bis-trifluoromethyl-4′-carbethoxy-thiocarbanilide settles out; it is dried under vacuum and then recrystallized from acetonitrile, whereupon it melts at 147.5–148° C.

(17) A solution of 21.5 grams of thiocyananiline in 100 cc. of acetonitrile is mixed with vigorous stirring with a solution of 36.5 grams of 3:5-bis-trifluoromethylphenyl isocyanate in 30 cc. of acetonitrile. The reaction mixture heats up to 50° C. On seeding, 3:5-bis-trifluoromethyl-4′-thiocyanocarbanilide is obtained in crystals which, on recrystallization from acetonitrile, melt at 204–205° C.

(18) A solution of 13.5 grams of para-aminoacetophenone in 100 cc. of acetonitrile is vigorously stirred with a solution of 25.5 grams of 3:5-bis-trifluoromethylphenyl isocyanate in 25 cc. of acetonitrile. 3:5-bis-trifluoromethyl-4′-acetocarbanilide settles out within a few seconds; it is suctioned off, recrystallized from butanol and washed with acetonitrile, whereupon it melts at 238–239° C.

(19) A solution of 11.8 grams of para-aminobenzonitrile in 100 cc. of acetonitrile is mixed with a solution of 25.5 grams of 3:5-bis-trifluoromethylphenyl isocyanate in 25 cc. of acetonitrile, whereupon 3:5-bis-trifluoromethyl-4′-cyanocarbanilide settles out after some time. It is suctioned off and recrystallized from acetonitrile; it melts at 252–253° C.

(20) A solution of 27.8 grams of meta-methylthioaniline in 100 cc. of acetonitrile is mixed with 51 grams of 3:5-bis-trifluoromethylphenyl isocyanate in acetonitrile. 3:5-bis-trifluoromethyl-3′-thiomethylcarbanilide settles out only slowly from the reaction mixture heated to 60° C.; it is suctioned off, washed and recrystallized from acetonitrile. It melts at 158–159.5° C.

(21) 3:5 - bis - trifluoromethyl - 3′-thiomethyl-thiocarbanilide is prepared from 3:5-bis-trifluoromethylphenyl isothiocyanate and freshly distilled 3-methylthioaniline; on recrystallization from benzene+cyclohexane it melts at 125–127° C.

(22) 3:5 - bis - trifluoromethyl - 2':4':6'-trichlorocarbanilide is obtained by condensation of 3:5-bis-trifluoromethylphenyl isocyanate and 2:4:6-trichloroaniline in acetonitrile at 60° C. The product melts at 225–227° C., then solidifies again at 229° C. and sublimes at about 295° C.

(23) To a solution of 21.2 grams of 2-chloro-6-methylaniline in 100 cc. of acetonitrile are added dropwise 38.25 grams of 3:5-bis-trifluoromethylphenyl isocyanate, whereupon 3:5 - bis - trifluoromethyl - 2' - chloro-6'-methylcarbanilide settles out spontaneously. On recrystallization from acetonitrile it melts at 227° C.

(24) A solution of 10 grams of 2-methylsulfonyl-4-nitraniline in 100 cc. of dimethylformamide is mixed with 10 grams of 3:5-bis-trifluoromethylaniline and the batch is heated for 2 hours at 50° C., then cooled, and 100 cc. of water are added. The precipitate so formed is filtered off and purified by crystallization from aqueous ethanol, to yield 3:5-bis-trifluoromethyl-2'-methylsulfonyl-4'-nitro-carbanilide in crystals melting at 227–230° C.

(25) A solution of 10 grams of 2-ethylsulfonyl-5-trifluoromethylaniline in 100 cc. of dimethylformamide is mixed with 10 grams of 3:5-bis-trifluoromethylphenyl isocyanate, and the whole is heated for 2 hours at 50° C. On addition of water a crystalline product precipitates which is recrystallized from methylene chloride+petroleum ether, to yield crystalline 3:5-bis-trifluoromethyl-2'-ethylsulfonyl - 5' - trifluoromethylcarbanilide melting at 173–175° C.

(26) A solution of 10 grams of 2:6-dinitro-4-amino-anisole in 100 cc. of dimethylformamide is mixed with 10 grams of 3:5-bis-trifluoromethylphenyl isocyanate, and the whole is heated for 2 hours at 50° C., then cooled, and 100 cc. of water are added. An oil settles out which crystallizes after standing for some time. On recrystallization from aqueous ethanol there is obtained crystalline 3:5 - bis-trifluoromethyl-3':5'-dinitro-4-methoxycarbanilide melting at 226–228° C.

(27) The thiocarbanilide used in the above examples may be prepared as follows:

A solution of 5.0 grams of 4-nitro-aniline and 10.0 g. of 3,5-bis-trifluoromethyl-phenyl isothiocyanate in 50 cc. of acetonitrile is heated for 4 hours at 80° C. After cooling, 100 cc. of water is added at room temperature, whereupon the 3:5 - bis-trifluoromethyl-4'-nitro-thiocarbanilide precipitates. After recrystallization from dimethylformamide+water, it melts at 175–177° C.

From the above compounds, preparations can be made as shown, for example, in Examples 1 or 2.

What is claimed is:

1. A pharmaceutical preparation containing a compound of the formula

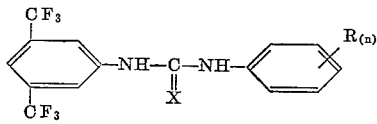

wherein R represents a member selected from the group consisting of lower alkyl, lower alkoxy, F, Cl, Br, I, —CF$_3$, —NO$_2$, —CN, —SO$_3$H, —SO$_2$NH$_2$, —SO$_2$CH$_3$, —OH, —SCN, —SO$_2$NHA,

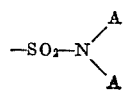

—COOH, COCH$_3$, —COOA, —CONH$_2$, —CONHA and —CONA$_2$, A standing for lower alkyl, $n$ for a whole number from 1 to 4, and X for S, in conjunction with an enterally acceptable pharmaceutical excipient.

2. A pharmaceutical preparation according to claim 1, containing 25–2000 mg. of the carbanilide per dosage unit.

3. A pharmaceutical preparation according to claim 1, containing the 3,5-bis-trifluoromethyl-4'-nitro thiocarbanilide of the formula

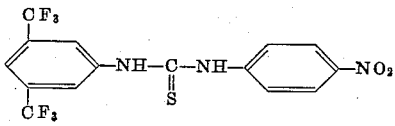

4. A pharmaceutical preparation according to claim 3, containing 25–2000 mg. of the carbanilide per dosage unit.

5. A pharmaceutical preparation according to claim 1, which in addition contains a lubricant laxative.

6. A pharmaceutical preparation according to claim 2, which in addition contains a lubricant laxative.

7. A pharmaceutical preparation according to claim 3, which in addition contains a lubricant laxative.

8. Method for the treatment of mammals infested by worms, comprising administering to the host, an anthelmintically effective amount of a compound of the formula

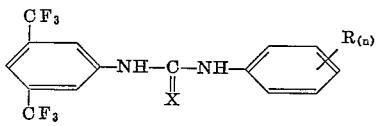

wherein R represents a member selected from the group consisting of lower alkyl, lower alkoxy, F, Cl, Br, I, —CF$_3$, —NO$_2$, —CN, —SO$_3$H, —SO$_2$NH$_2$, —SO$_2$CH$_3$, —OH, —SCN, —SO$_2$NHA,

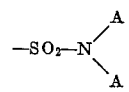

—COOH, —COCH$_3$, —COOA, —CONH$_2$, —CONHA and —CONA$_2$, A standing for lower alkyl, $n$ for a whole number from 1 to 4, and X for a member selected from the group consisting of O and S.

9. Method for the treatment of mammals infested by worms, comprising administering to the host, an anthelmintically effective amount of 3,5-bis-trifluoromethyl-4'-nitro-carbanilide.

10. Method for the treatment of mammals infested by worms, comprising administering to the host, an anthelmintically effective amount of 3,5-bis-trifluoromethyl-4'-nitro-thiocarbanilide.

11. Method for the treatment of mammals infested by worms, comprising administering to the host a compound of the formula

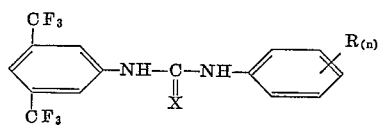

wherein R represents a member selected from the group consisting of lower alkyl, lower alkoxy, F, Cl, Br, I, —CF$_3$, —NO$_2$, —CN, —SO$_3$H, —SO$_2$NH$_2$, —SO$_2$CH$_3$, —OH, —SCN, —SO$_2$NHA,

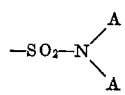

—COOH, —COCH$_3$, —COOA, —CONH$_2$, —CONHA and —CONA$_2$, A standing for lower alkyl, $n$ for a whole number from 1 to 4, and X for a member selected from the group consisting of O and S in a dosage of 25–2000 mg.

12. Method for the treatment of mammals infested by worms, comprising administering to the host, 3,5-bis-trifluoromethyl-4'-nitro-thiocarbanilide in a dosage of 25–2000 mg.

13. Method for the treatment of mammals infested by worms, comprising administering to the host 3,5-bis-trifluoromethyl-4′-nitro-thiocarbanilide in a dosage of 25–2000 mg.

14. Method for the treatment of mammals infested by worms, comprising administering to the host 3,5-bis-trifluoromethyl-4′-nitro-carbanilide in a dosage of 100–500 mg.

15. Method for the treatment of mammals infested by worms, comprising administering to the host 3,5-bis-trifluoromethyl-4′-nitrothiocarbanilide in a dosage of 100–500 mg.

References Cited

UNITED STATES PATENTS

| 2,745,874 | 5/1956 | Schetty | 167—30 |
| 2,983,646 | 5/1961 | Ruhoff | 167—55 |
| 3,073,861 | 1/1963 | Raasch | 167—55 |
| 3,230,141 | 1/1966 | Frick | 167—38.6 |

SAM ROSEN, *Primary Examiner.*

JULIAN S. LEVITT, *Examiner.*